United States Patent
Tomonaga et al.

(10) Patent No.: US 12,534,432 B2
(45) Date of Patent: Jan. 27, 2026

(54) TRISULFIDE COMPOUND

(71) Applicant: Kyowa Pharma Chemical Co., Ltd., Takaoka (JP)

(72) Inventors: Shoichiro Tomonaga, Takaoka (JP); Takahiro Isobe, Takaoka (JP); Etsuo Ohshima, Takaoka (JP)

(73) Assignee: Kyowa Pharma Chemical Co., Ltd., Takaoka (JP)

( * ) Notice: Subject to any disclaimer, the term of this patent is extended or adjusted under 35 U.S.C. 154(b) by 455 days.

(21) Appl. No.: 18/042,705

(22) PCT Filed: Aug. 23, 2021

(86) PCT No.: PCT/JP2021/030755
§ 371 (c)(1),
(2) Date: Feb. 23, 2023

(87) PCT Pub. No.: WO2022/045052
PCT Pub. Date: Mar. 3, 2022

(65) Prior Publication Data
US 2023/0357141 A1    Nov. 9, 2023

(30) Foreign Application Priority Data
Aug. 27, 2020   (JP) .................. 2020-143639

(51) Int. Cl.
*C07C 321/14*    (2006.01)
*A61K 9/19*      (2006.01)

(52) U.S. Cl.
CPC .............. *C07C 321/14* (2013.01); *A61K 9/19* (2013.01)

(58) Field of Classification Search
None
See application file for complete search history.

(56) References Cited

FOREIGN PATENT DOCUMENTS

| CN | 107652264 A | 2/2018 |
|---|---|---|
| JP | S50-088215 A | 7/1975 |
| JP | S53-028118 A | 3/1978 |
| JP | H05-085926 A | 4/1993 |
| WO | WO 1996/000241 A | 1/1996 |
| WO | WO 2020/158894 A1 | 8/2020 |
| WO | WO 2021/054149 A1 | 3/2021 |

OTHER PUBLICATIONS

Japan Patent Office, International Search Report in International Patent Application No. PCT/JP2021/030755 (Oct. 5, 2021).
Japan Patent Office, International Preliminary Report on Patentability in International Patent Application No. PCT/JP2021/030755 (Feb. 28, 2023).

*Primary Examiner* — Ana Z Muresan
(74) *Attorney, Agent, or Firm* — Leydig, Voit & Mayer, Ltd.

(57) ABSTRACT

A compound represented by Formula (1) below or a salt thereof.

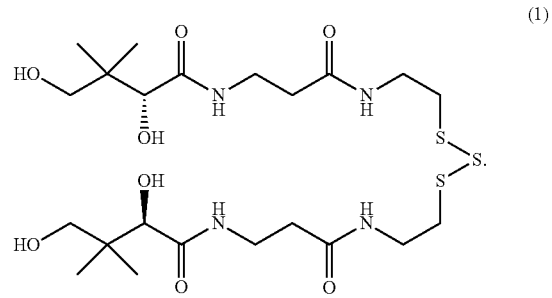

20 Claims, 1 Drawing Sheet

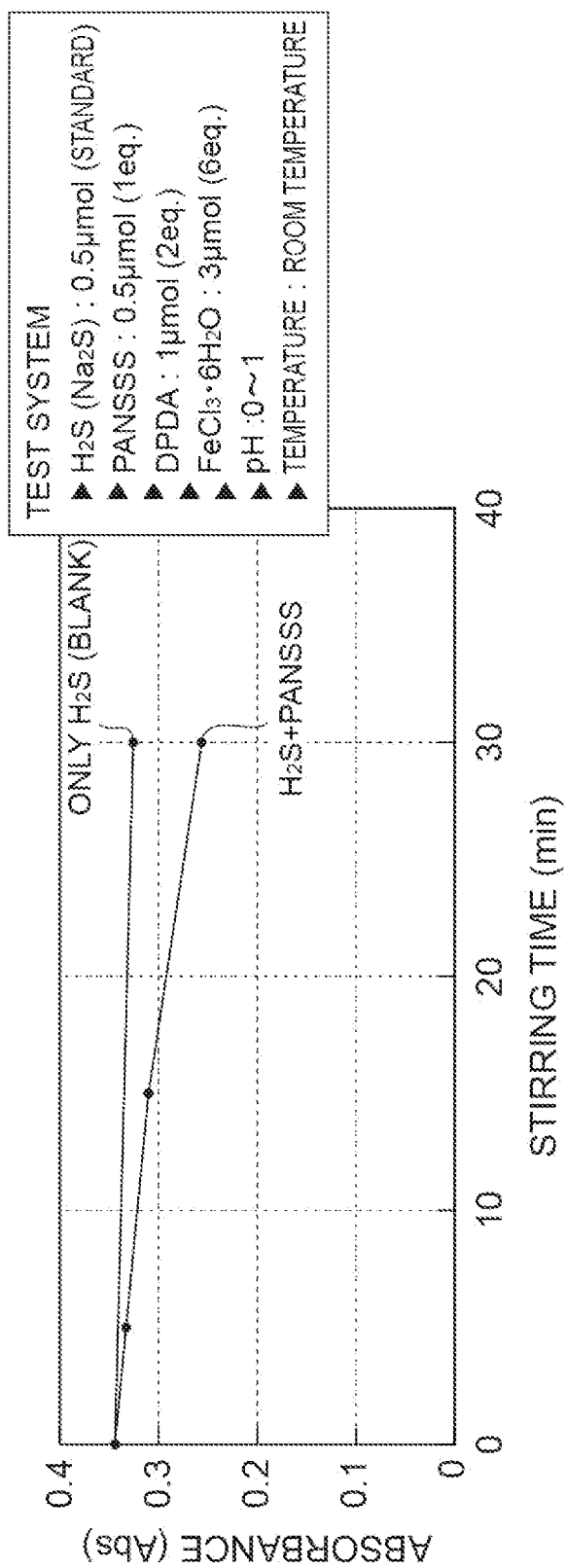

TRISULFIDE COMPOUND

TECHNICAL FIELD

The present invention relates to a trisulfide compound.

BACKGROUND ART

A compound having a covalent bond structure consisting of three continuous sulfur atoms (—S—S—S—) is called a trisulfide compound. Trisulfide compounds are expected to have various physiologically active functions because they have oxidation-reduction ability depending on the possible valence of constituent sulfur atoms.

Patent Literature 1 discloses lipoic acid trisulfide obtained by trisulfidating α-lipoic acid used for treating diabetes or chronic hepatitis.

CITATION LIST

Patent Literature

[Patent Literature 1] CN. 107652264

SUMMARY OF INVENTION

Technical Problem

An object of the present invention is to provide a novel trisulfide compound.

Solution to Problem

The present inventors have found pantethine trisulfide while searching for novel trisulfide compounds. The present invention relates to [1] below

[1] A compound represented by Formula (1) or a salt thereof

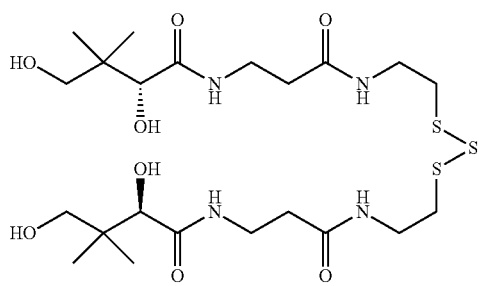

(1)

[2] A freeze-dried preparation comprising: the compound or the salt thereof according to [1].

Advantageous Effects of Invention

According to the present invention, it is possible to provide pantethine trisulfide which is a novel compound. When pantethine trisulfide is incorporated into a living body, it is expected to be converted into pantethine and pantetheine, thereby exhibiting physiologically active effects of pantethine and pantetheine. In addition, pantethine trisulfide is expected to have various physiologically active functions because it has oxidation-reduction ability depending on the possible valence of constituent sulfur atoms. Pantethine trisulfide is also expected to react in vivo with hydrogen sulfide or cysteine residues of proteins and be converted into pantethine persulfide represented by Formula (2) below. As a result, pantethine trisulfide is expected to exhibit a vasodilation effect, an anti-inflammatory effect, a neuroprotective effect, a vasoprotective effect, a renal protection effect, a cardioprotective effect, a hepatoprotective effect, a respiratory protection effect, an active oxygen elimination effect, a hydrogen sulfide elimination effect, and the like.

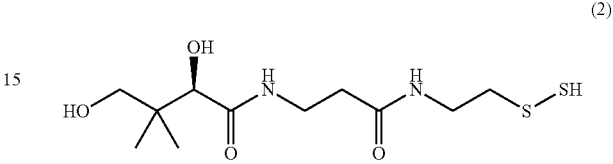

(2)

BRIEF DESCRIPTION OF DRAWINGS

FIG. 1 is a graph showing a hydrogen sulfide-trapping ability (hydrogen sulfide elimination effect) of pantethine trisulfide.

DESCRIPTION OF EMBODIMENT

A pantethine trisulfide according to one embodiment of the present invention is a compound represented by Formula (1) below (hereinafter also referred to as a "compound (1)").

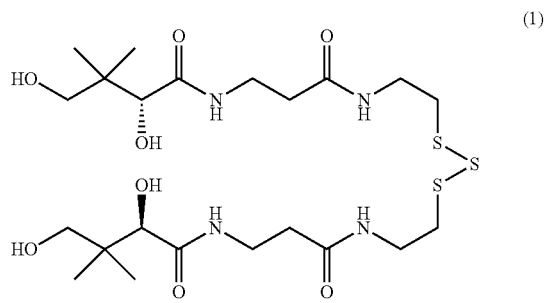 [SMILES: CC(C)(CO)[C@@H](O)C(=O)NCCC(=O)NCCSSSCCNC(=O)CCNC(=O)[C@H](O)C(C)(C)CO]

(1)

A salt of the compound represented by Formula (1) above may be a pharmacologically acceptable salt, and examples thereof include salts with alkali metals such as sodium and potassium; salts with alkaline earth metals such as calcium and magnesium; inorganic acid salts such as ammonium salts and hydrochlorides; and organic acid salts such as acetates. In a case where the compound (1) is obtained as a free form, it can be converted into a salt through a conventional method. In addition, even in a case where the compound (1) is obtained as a salt, it can be converted into a free form through a conventional method.

The compound (1) or a salt thereof can be used as a pharmaceutical composition by adding pharmacologically acceptable additives thereto as necessary. A pharmaceutical composition comprising the compound (1) or a salt thereof can be used for prevention and treatment of pantothenic acid deficiency like pantethine.

A pharmaceutical composition comprising the compound (1) or a salt thereof can be formulated, for example, as an injection or an oral agent. Examples of injections include subcutaneous injections, intramuscular injections, intravenous injections, and intraperitoneal injections. Examples of oral agents that can be formulated include tablets, granules, fine granules, powders, and capsules. Examples of additives include stabilizers such as saccharides (sucrose, trehalose, maltose, lactose and the like), sugar alcohols (sorbitol and the like), amino acids (L-arginine and the like), water-soluble polymers (hydroxyethyl starch (HES), polyvinyl pyrrolidone (PVP) and the like), and nonionic surfactants (polysorbate, poloxamers and the like); pH adjusters such as sodium phosphate buffer solutions and histidine buffer solutions; isotonic agents such as sodium chloride; and excipients such as mannitol, glycine, table salt, and sucrose.

The above-described injections may be freeze-dried through a usual method to prepare a freeze-dried preparation which is dissolved before use. The injections can be produced through methods commonly used in production of pharmaceuticals and the like. Specifically, for example, in an environment maintained at a constant temperature of 5° C. to 25° C., water is charged into a container, and the compound (1) or a salt thereof and additives weighed in advance are added thereto while gently stirring the water. The pH is adjusted to a desired level, and sterilization is performed through filtration with a filter or the like. A container such as a glass vial may be filled with the sterilized liquid and sealed with a rubber stopper or the like. In a case where the obtained liquid preparation of the present invention is made into a freeze-dried preparation, it may be freeze-dried through methods well known per se. The freeze-dried preparation can stably maintain the compound (1) or a salt thereof over a long period of time.

The pantethine trisulfide according to the present embodiment can be produced through a step of oxidizing pantethine with an oxidizing agent to obtain pantethine sulfoxide (Step 1); and a step of allowing the obtained pantethine sulfoxide to react with a sulfur source to obtain a trisulfide compound (Step 2).

In the above-described production method, Step 1 and Step 2 may be performed in a one-pot reaction without isolating pantethine sulfoxide.

A solvent used in Step 1 is not particularly limited as long as it dissolves pantethine and an oxidizing agent and does not inhibit the oxidation reaction. Examples of such solvents include water, a sulfuric acid aqueous solution, an ethanol aqueous solution, and an acetonitrile aqueous solution, and water is preferable. The amount of solvent used in Step 1 can be 1 mL to 500 mL, preferably 10 mL to 20 mL with respect to 1 gram of pantethine.

Examples of oxidizing agents used in Step 1 include potassium peroxymonosulfate (available under a trade name such as Oxone (registered trademark) or the like), peracetic acid, hydrogen peroxide, and sodium periodate. Hydrogen peroxide may be used with a catalytic amount of methyltrioxorhenium. Potassium peroxymonosulfate is a preferred oxidizing agent from the viewpoints of safety and costs. The amount of oxidizing agent used can be 0.8 equivalents to 2.0 equivalents, preferably 1.0 equivalent to 1.3 equivalents with respect to 1 equivalent of pantethine.

The reaction temperature in Step 1 can be −20° C. to 30° C., preferably −5° C. to 5° C.

The reaction time of Step 1 can be 5 minutes to 24 hours, preferably 0.5 hours to 2 hours.

A solvent used in Step 2 is not particularly limited as long as it dissolves pantethine sulfoxide and a sulfur source and does not inhibit the reaction thereafter. Examples of such solvents include water, a sulfuric acid aqueous solution, an ethanol aqueous solution, and an acetonitrile aqueous solution, and water is preferable. The amount of solvent used in Step 2 can be 1 mL to 500 mL, preferably 10 mL to 20 mL with respect to 1 gram of pantethine sulfoxide.

Examples of sulfur sources used in Step 2 include sodium sulfide, potassium sulfide, sodium hydrosulfide, potassium hydrosulfide, and hydrogen sulfide. The amount of sulfur source used can be 0.5 equivalents to 4.0 equivalents, preferably 0.9 equivalents to 1.2 equivalents with respect to 1 equivalent of the sulfoxide compound.

The reaction temperature in Step 2 can be −20° C. to 30° C., preferably −5° C. to 25° C.

The reaction time of Step 2 can be 10 minutes to 2 days, preferably 0.5 hours to 2 hours.

In a case where Step 1 and Step 2 are performed in a one-pot reaction, examples of reaction solvents include water, a sulfuric acid aqueous solution, an ethanol aqueous solution, and an acetonitrile aqueous solution, and water is preferable, and the amount of solvent can be 1 mL to 500 mL, preferably 10 mL to 20 mL with respect to 1 gram of a disulfide compound. Examples of oxidizing agents used include potassium peroxymonosulfate, peracetic acid, hydrogen peroxide (which may be used with a catalytic amount of methyltrioxorhenium), and sodium periodate, preferably potassium peroxymonosulfate. The amount of oxidizing agent used can be 0.8 equivalents to 2.0 equivalents, preferably 1.0 equivalent to 1.3 equivalents with respect to 1 equivalent of pantethine. The amount of oxidizing agent used can be 0.8 equivalents to 2.0 equivalents, preferably 1.0 equivalent to 1.3 equivalents with respect to 1 equivalent of pantethine. Examples of sulfur sources used include sodium sulfide, potassium sulfide, sodium hydrosulfide, potassium hydrosulfide, and hydrogen sulfide. The amount of sulfur source used can be 0.5 equivalents to 4.0 equivalents, preferably 0.9 equivalents to 1.2 equivalents with respect to 1 equivalent of pantethine. The reaction temperature can be −20° C. to 30° C., preferably −5° C. to 25° C. The reaction time can be 15 minutes to 2 days, preferably 1 hour to 4 hours.

In addition to Step 1 and Step 2, a step of protecting functional groups such as a hydroxy group, a carbonyl group, an amino group, and a carboxy group and a step of deprotecting the protected functional groups may be comprised as necessary. Protective groups for these functional groups and protection and deprotection reactions are well known to those skilled in the art, and appropriate protective groups and protection and deprotection reactions can be selected with reference to "Greene's Protective Groups in Organic Synthesis" and the like.

The pantethine trisulfide can also be produced through a step of oxidizing pantetheine with an oxidizing agent to obtain pantethine sulfoxide (Step 1'); and a step of allowing the obtained pantethine sulfoxide to react with a sulfur source to obtain a pantethine trisulfide (Step 2).

In the above-described production method, the steps may be performed in a one-pot reaction without isolating pantethine sulfoxide.

A solvent used in Step 1' is not particularly limited as long as it dissolves pantetheine and an oxidizing agent and does not inhibit the oxidation reaction. Examples of such solvents include water, a sulfuric acid aqueous solution, an ethanol aqueous solution, and an acetonitrile aqueous solution, and water is preferable. The amount of solvent used in Step 1' can be 1 mL to 500 mL, preferably 10 mL to 20 mL with respect to 1 gram of pantetheine.

Oxidizing agents used in Step 1' and the amount thereof are the same as those described in Step 1.

The reaction temperature in Step 1' can be −20° C. to 30° C., preferably −5° C. to 5° C.

The reaction time of Step 1' can be 10 minutes to 24 hours, preferably 0.5 hours to 2 hours.

In a case where Step 1' and Step 2 are performed in a one-pot reaction, examples of reaction solvents include water, a sulfuric acid aqueous solution, an ethanol aqueous solution, and an acetonitrile aqueous solution, preferably water, and the amount of solvent can be 1 mL to 500 mL, preferably 10 mL to 20 mL with respect to 1 gram of pantetheine. Examples of oxidizing agents used include potassium peroxymonosulfate, peracetic acid, hydrogen peroxide (which may be used with a catalytic amount of methyltrioxorhenium), and sodium periodate, preferably potassium peroxymonosulfate. The amount of oxidizing agent used can be 0.8 equivalents to 2.0 equivalents, preferably 1.0 equivalent to 1.3 equivalents with respect to 1 equivalent of a thiol compound. Examples of sulfur sources used include sodium sulfide, potassium sulfide, sodium hydrosulfide, potassium hydrosulfide, and hydrogen sulfide. The amount of sulfur source used can be 0.5 equivalents to 4.0 equivalents, preferably 0.9 equivalents to 1.2 equivalents with respect to 1 equivalent of pantetheine. The reaction temperature can be −20° C. to 30° C., preferably −5° C. to 25° C. The reaction time can be 15 minutes to 2 days, preferably 1 hour to 4 hours.

In addition to Step 1' and Step 2, a step of protecting functional groups such as a hydroxy group, a carbonyl group, an amino group, and a carboxy group and a step of deprotecting the protected functional groups may be comprised as necessary. Protective groups for these functional groups and protection and deprotection reactions are well known to those skilled in the art, and appropriate protective groups and protection and deprotection reactions can be selected with reference to "Greene's Protective Groups in Organic Synthesis" and the like.

EXAMPLES

Hereinafter, the present invention will be described in detail with reference to examples. However, the present invention is not limited by these examples.

Example 1

<Production of Pantethine Trisulfide>

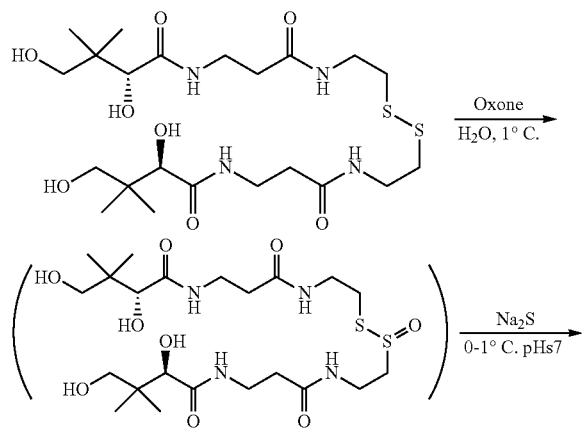

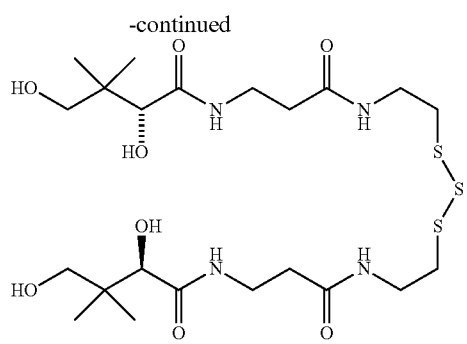

After charging 18.75 g (27.04 mmol, 15.00 g as pantethine) of a 80% pantethine aqueous solution and 180 mL (12.0 v/w) of water to a 1 L four-neck flask, the internal temperature was cooled to 1° C. 10.34 g of Oxone (registered trademark) (31.02 mmol, 1.15 equivalents, calculated as available oxygen of 4.8%) was added thereto in 4 portions every 10 minutes, and then the flask was washed with 8 mL of water and a reaction was carried out for about 3 hours. 45 mL of a 0.67 mol/L sodium sulfide aqueous solution (29.98 mmol, 1.11 equivalents) was added dropwise thereto over 45 minutes at an internal temperature of 0° C. to 1° C., and the pH was controlled at 7 or lower during dropwise addition using 1.6 mL of a 3 mol/L sulfuric acid aqueous solution. After the mixture was allowed to react at an internal temperature of 1° C. and at pH 4 for 40 minutes, 500 mL (33.3 v/w) of ethanol was added thereto at an internal temperature of 1° C. to 5° C. to precipitate inorganic salts, and then the resultant was stirred at an internal temperature of 1° C. to 5° C. for 30 minutes. The inorganic salts were filtered and then washed with 50 mL (3.3 v/w) of ethanol, and the filtrate and wash liquid were concentrated under reduced pressure at an external temperature of 23° C. to obtain 34 g of a crude body of pantethine trisulfide. Then, the crude body was dissolved by charging 6 mL of water thereto, and 40 g (2.7 w/w) of a stock solution for column purification was prepared. Purification was performed using an ODS column, and fractions with an LC purity of 95% or higher were collected. The fractions were concentrated under reduced pressure at an external temperature of 30° C. and then dried with an oil pump to obtain 9.57 g of pantethine trisulfide (16.31 mmol, yield 60%, white solid).

$^1$H NMR: (D$_2$O, 400 MHz) δ (ppm)=3.97 (s, 2H), 3.44-3.58 (m, 10H), 3.37 (d, J=11.4 Hz, 2H), 3.04 (t, J=6.2 Hz, 4H), 2.50 (t, J=6.2 Hz, 4H), 0.91 (s, 6H), 0.87 (s, 6H).

HR-ESI-TOF-MS: m/z 585.2086 ([M-H]$^-$), calcd for [C$_{22}$H$_{41}$N$_4$O$_8$S$_3$]-585.2092.

<Purity Test for Pantethine Trisulfide>

Detector: Ultraviolet absorptiometer (measurement wavelength: 220 nm)

Column: LiChrosorb RP-18 (Kanto Chemical Co., Inc., 4.0 mm I.D.×250 mm, 5 μm)

Column temperature: Constant temperature around 40° C.

Mobile phase A: Phosphoric acid aqueous solution (pH 3)

Mobile phase B: Methanol

Mobile phase delivery: The mixing ratio of the mobile phase A and the mobile phase B was changed as follows to control the concentration gradient.

TABLE 1

| Time after injection (minute) | Mobile phase A (vol %) | Mobile phase B (vol %) |
|---|---|---|
| 0 to 5 | 100 | 0 |
| 5 to 15 | 100 → 50 | 0 → 50 |
| 15 to 40 | 50 | 50 |
| 40 to 41 | 50 → 100 | 50 → 0 |
| 41 to 50 | 100 | 0 |

Flow rate: 0.6 mL/min
Injection volume: 5 μL
Area measurement range: 40 minutes after injecting sample solution
Retention time: pantethine sulfoxide (about 20 minutes), pantethine (about 22 minutes), pantethine trisulfide (about 23 minutes)

Example 2

The presence or absence of a hydrogen sulfide-trapping ability (hydrogen sulfide elimination effect) of pantethine trisulfide (PANSSS) was evaluated through methylene blue spectrophotometry.
<Preparation of $H_2S$ Standard Solution>
Sodium sulfide nonahydrate ($Na_2S \cdot 9H_2O$) was dissolved in purified water to prepare a 50 μmol/L sodium sulfide nonahydrate solution, which was used as a $H_2S$ standard solution.
<Preparation of p-Aminodimethylaniline (DPDA) Solution>
p-Aminodimethylaniline was dissolved in 10 N sulfuric acid to prepare 1 mmol/L DPDA solution.
<Preparation of Iron (III) Chloride Hexahydrate ($FeCl_3 \cdot 6H_2O$) Solution>
Iron (III) chloride hexahydrate was dissolved in 1% sulfuric acid to prepare a 3 mmol/L $FeCl_3 \cdot 6H_2O$ solution.
<Preparation of Pantethine Trisulfide (PANSSS) Solution>
A 0.5 mmol/L pantethine trisulfide solution was prepared by dissolving pantethine trisulfide in 25 mmol/L phosphate buffer (PBS, pH 7).
<Test Method>
10 mL of the $H_2S$ standard solution (0.5 μmol, standard) was added to a stoppered test tube and stirred. 1 mL (0.5 μmol, 1 eq.) of PBS (blank) or the pantethine trisulfide solution was added to this solution and stirred for a predetermined time (0, 5, 15 or 30 minutes). After stirring, 1 mL (1 μmol, 2 eq.) of the DPDA solution and 1 mL (3 μmol, 6 eq.) of the $FeCl_3 \cdot 6H_2O$ solution were added thereto and further stirred, and the absorbance (wavelength: 668 nm) of the solution was measured after the absorbance of the solution stopped changing (that is, after color development due to methylene blue production was completed). This test was conducted under the conditions of room temperature.
<Test Results>
The results are shown in FIG. 1. In FIG. 1, the stirring time on the horizontal axis indicates stirring time of the mixture of the $H_2S$ standard solution and the PBS (blank) or pantethine trisulfide solution before the addition of the coloring agents (the DPDA solution and $FeCl_3 \cdot 6H_2O$ solution). It was confirmed that the longer the contact time (reaction time) between $H_2S$ and pantethine trisulfide, the lower the absorbance compared to the blank (FIG. 1). It was assumed that this was because $H_2S$ and pantethine trisulfide reacted to consume $H_2S$, resulting in a decrease in the amount of methylene blue produced compared to the blank.

As described above, it was determined that pantethine trisulfide had a hydrogen sulfide-trapping ability (hydrogen sulfide elimination effect).

The invention claimed is:
1. A compound represented by Formula (1) or a salt thereof:

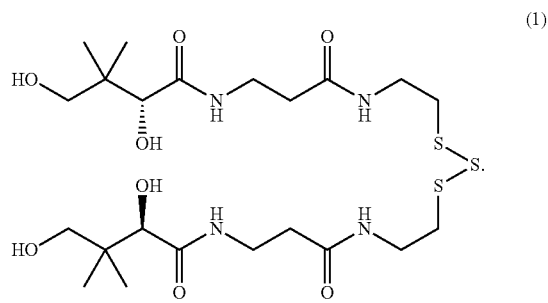 [SMILES: CC(C)(CO)[C@@H](O)C(=O)NCCC(=O)NCCSSSCCNC(=O)CCNC(=O)[C@H](O)C(C)(C)CO]

2. The compound or the salt thereof according to claim 1, wherein the salt of the compound is a salt with alkali metal.
3. The compound or the salt thereof according to claim 1, wherein the salt of the compound is a salt with alkaline earth metal.
4. The compound or the salt thereof according to claim 1, wherein the salt of the compound is an inorganic acid salt.
5. The compound or the salt thereof according to claim 1, wherein the salt of the compound is an organic acid salt.
6. A pharmaceutical composition comprising the compound or the salt thereof according to claim 1 and a pharmacologically acceptable additive.
7. The pharmaceutical composition according to claim 6, wherein the salt of the compound is a salt with alkali metal.
8. The pharmaceutical composition according to claim 6, wherein the salt of the compound is a salt with alkaline earth metal.
9. The pharmaceutical composition according to claim 6, wherein the salt of the compound is an inorganic acid salt.
10. The pharmaceutical composition according to claim 6, wherein the salt of the compound is an organic acid salt.
11. The pharmaceutical composition according to claim 6, wherein the pharmaceutical composition is an injectable composition.
12. The pharmaceutical composition according to claim 11, wherein the salt of the compound is a salt with alkali metal.
13. The pharmaceutical composition according to claim 11, wherein the salt of the compound is a salt with alkaline earth metal.
14. The pharmaceutical composition according to claim 11, wherein the salt of the compound is an inorganic acid salt.
15. The pharmaceutical composition according to claim 11, wherein the salt of the compound is an organic acid salt.
16. The pharmaceutical composition according to claim 11, wherein the pharmaceutical composition is a freeze-dried composition.
17. The pharmaceutical composition according to claim 16, wherein the salt of the compound is a salt with alkali metal.
18. The pharmaceutical composition according to claim 16, wherein the salt of the compound is a salt with alkaline earth metal.

19. The pharmaceutical composition according to claim 16, wherein the salt of the compound is an inorganic acid salt.

20. The pharmaceutical composition according to claim 16, wherein the salt of the compound is an organic acid salt.

* * * * *